(12) United States Patent
Kim et al.

(10) Patent No.: US 8,111,782 B2
(45) Date of Patent: Feb. 7, 2012

(54) APPARATUS AND METHOD FOR TRANSMITTING/RECEIVING DATA IN A MULTI-ANTENNA SYSTEM, AND SYSTEM USING THE SAME

(75) Inventors: Sung-Jin Kim, Suwon-si (KR); June Moon, Seoul (KR); Yongxing Zhou, Yongin-si (KR); Jae-Hee Cho, Seoul (KR); Keun-Chul Hwang, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 947 days.

(21) Appl. No.: 11/896,479

(22) Filed: Aug. 31, 2007

(65) Prior Publication Data

US 2008/0056414 A1     Mar. 6, 2008

Related U.S. Application Data

(60) Provisional application No. 60/841,246, filed on Aug. 31, 2006.

(30) Foreign Application Priority Data

Jul. 20, 2007    (KR) ........................ 10-2007-0073155

(51) Int. Cl.
     *H04L 27/00*          (2006.01)
(52) U.S. Cl. ........ 375/316; 375/260; 375/262; 375/267; 375/295; 375/299; 375/347; 375/348; 375/349
(58) Field of Classification Search .................. 375/316, 375/347, 260, 262, 267, 295, 299, 348, 349; 370/203, 204, 205, 206, 207, 208, 209, 210; 455/130, 131, 132, 134, 135, 137
See application file for complete search history.

(56) References Cited

U.S. PATENT DOCUMENTS 7,428,269 B2 *   9/2008   Sampath et al. .............. 375/267
(Continued)

FOREIGN PATENT DOCUMENTS

JP      2005-237006 A     9/2005
(Continued)

OTHER PUBLICATIONS

Qualcomm Europe, "Description and link simulations of MIMO schemes for OFDMA based E-UTRA downlink evaluation," 3GPP TSG RAN WG1 Meeting R1-42, Aug. 29-Sep. 2, 2005, London, Agenda Item 10.5.2, Document R1-050903, Aug. 25, 2005, 12 pages.

(Continued)

*Primary Examiner* — Dhaval Patel
(74) *Attorney, Agent, or Firm* — NSIP Law

(57) ABSTRACT

A data reception apparatus and method for generating and transmitting feedback information in a multi-antenna system using grouped antennas, and a data transmission apparatus and method for transmitting a data stream of a user according to a transmission mode selected depending on the feedback information is disclosed. The reception apparatus generates feedback information depending on maximum channel quality information, an antenna group index associated with the maximum channel quality information, rank information, and remaining channel quality information associated with the rank information, and transmits the feedback information to the transmission apparatus. The transmission apparatus selects one of a multi-user mode and a single-user mode as a transmission mode depending on the feedback information and transmits a data stream of a user via multiple antenna groups or one antenna group, according to the selected transmission mode.

34 Claims, 6 Drawing Sheets

U.S. PATENT DOCUMENTS

| | | |
|---|---|---|
| 2003/0125040 A1* | 7/2003 | Walton et al. ............... 455/454 |
| 2005/0192019 A1 | 9/2005 | Kim et al. |
| 2005/0195912 A1 | 9/2005 | Kim et al. |
| 2005/0281221 A1 | 12/2005 | Roh et al. |
| 2007/0183414 A1 | 8/2007 | Hoshino et al. |
| 2008/0013610 A1* | 1/2008 | Varadarajan et al. ......... 375/221 |
| 2008/0108310 A1* | 5/2008 | Tong et al. ..................... 455/69 |

FOREIGN PATENT DOCUMENTS

| | | |
|---|---|---|
| KR | 10-2005-0120520 A | 12/2005 |
| WO | WO 03/085875 A1 | 10/2003 |
| WO | WO 2005/078957 A1 | 8/2005 |
| WO | WO 2005/104397 | 11/2005 |

OTHER PUBLICATIONS

Decision on Grant issued on Dec. 21, 2009, in counterpart Korean Application No. 10-2007-0073155 (4 pages, in Korean, no English translation).

Japanese Office Action issued on Jan. 12, 2010, in counterpart Japanese Application No. 2007-226187 (2 pages, in Japanese, no English translation).

Chinese Office Action issued on Sep. 9, 2010, in corresponding Chinese Application No. 200710305139.7 (6 pages).

* cited by examiner

APPARATUS AND METHOD FOR TRANSMITTING/RECEIVING DATA IN A MULTI-ANTENNA SYSTEM, AND SYSTEM USING THE SAME

PRIORITY

This application claims the benefit under 35 U.S.C. §119(e) of U.S. Patent Provisional Application No. 60/841,246, filed Aug. 31, 2006, in the United States Patent and Trademark Office, and claims the benefit under 35 U.S.C. §119(a) of Korean Patent Application No. 2007-73155, filed Jul. 20, 2007, in the Korean Intellectual Property Office, the entire disclosures of which are incorporated herein by reference.

BACKGROUND OF THE INVENTION

1. Field of the Invention

The present invention relates generally to a data transmission/reception apparatus and method in a multi-antenna system, and a system using the same. More particularly, the present invention relates to an apparatus and method for transmitting/receiving data by antenna grouping, and a system using the same.

2. Description of the Related Art

Conventionally, the wireless channel environment, unlike the wired channel environment, shows a lower reliability due to multipath interference, shadowing, propagation loss, time-varying noise, interference, etc. This is the typical cause of obstruction to an increase in a data transfer rate, or a data rate, in mobile communication. Therefore, to implement a high-speed wireless environment for providing high-rate services, there is an urgent need for a solution to the foregoing problem.

A Multi Input Multi Output (MIMO) multi-antenna system is a conventional technology that has been proposed for addressing the problem of lower reliability in a wireless channel environment. The proposed MIMO multi-antenna system has an advantage of being capable of increasing performance of the system without addition of power and spectrum.

Generally, the multi-antenna system supports a Single-User (SU) mode and a Multi-User (MU) mode. A multi-antenna system supporting the SU mode transmits data to the same user via multiple transmission antennas, and a multi-antenna system supporting the MU mode transmits data to multiple users via multiple transmission antennas. The multi-antenna system supporting the MU mode has been proposed to obtain improved performance compared to the multi-antenna system supporting the SU mode, while minimizing an increase in the number of antennas and an increase in complexity of the hardware structure. In addition, the MU mode lays emphasis on improvement of the system's transmission capacity using Spatial Division Multiple Access (SDMA) scheduling.

The multi-antenna system is classified into a closed-loop scheme that depends on feedback information for resource allocation, and a closed-loop that does not depend on feedback information. For the closed-loop scheme, the most important issue is to prepare a scheme for minimizing feedback information for efficient resource allocation. Particularly, in the MU mode, there has long been a need for a reduction in the amount of feedback information.

Meanwhile, due to the diversification of the wireless communication services, there is a probability that terminals having different characteristics will coexist in the same service area. Therefore, a base station should be able to support various communication schemes. For example, the base station should be able to selectively support not only the SU mode but also the MU mode. In addition, for signal detection, the base station should be able to support both a terminal using a linear detection technique and a terminal using a nonlinear detection technique.

Accordingly, there is a need for an improved apparatus and method for generating and transmitting feedback information in a multi-antenna system using grouped antennas, and a data transmission apparatus and method for transmitting a data stream of a user according to a transmission mode selected depending on the feedback information.

SUMMARY OF THE INVENTION

Exemplary embodiments of the present invention address at least the above problems and/or disadvantages and provide at least the advantages described below. Accordingly, an aspect of exemplary embodiments of the present invention is to provide a data transmission/reception apparatus and method for performing data transmission/reception by means of a communication scheme optimized by taking channel condition into account, and a system using the same.

Another aspect of exemplary embodiments of the present invention is to provide a data transmission/reception apparatus and method for supporting data transmission/reception based on antenna grouping without an increase in feedback information in a multi-antenna system, and a system using the same.

Another aspect of exemplary embodiments of the present invention is to provide an apparatus and method for generating feedback information taking into consideration both a linear detection technique and a nonlinear detection technique for signal detection in a multi-antenna system using grouped antennas.

Another aspect of exemplary embodiments of the present invention is to provide a data transmission/reception apparatus and method for supporting various transmission modes depending on feedback information in a multi-antenna system using grouped antennas, and a system using the same.

Another aspect of exemplary embodiments of the present invention is to provide a data transmission/reception apparatus and method for generating and transmitting feedback information to selectively support an SU mode and an MU mode in a multi-antenna system using grouped antennas, and a system using the same.

Another aspect of exemplary embodiments of the present invention is to provide a multi-antenna system in which a transmission apparatus transmits different signals to reception apparatuses separately via its antennas, and if the reception apparatuses each generate feedback information separately for each stream group determined based on a signal received individually via each of the antennas and transmit the generated feedback information to the transmission apparatus, the transmission apparatus analyzes the received feedback information and schedules/transmits data streams to multiple users by means of various transmission modes, and a data transmission/reception apparatus and method thereof.

According to an aspect of exemplary embodiments of the present invention, there is provided a method for receiving data in a closed-loop multi-antenna system that defines multiple antenna groups by antenna grouping on multiple antennas, and performs data transmission individually via each of the multiple antenna groups. The data reception method includes acquiring, from a received signal, channel quality information for each data stream transmitted individually via each antenna group; determining, from the channel quality information acquired individually for each antenna group, maximum channel quality information, an antenna group index associated with the maximum channel quality information, rank information, and remaining channel quality information associated the rank information; and transmitting the determined maximum channel quality information, antenna group index, rank information, and remaining channel quality information to a transmission apparatus as feedback information.

According to another aspect of exemplary embodiments of the present invention, there is provided an apparatus for receiving data in a closed-loop multi-antenna system that defines multiple antenna groups by antenna grouping on multiple antennas, and performs data transmission individually via each of the multiple antenna groups. The data reception apparatus includes a channel estimator for acquiring, from a received signal, channel quality information for each data stream transmitted individually via each antenna group; a feedback information generator for determining, from the channel quality information acquired individually for each antenna group, maximum channel quality information, an antenna group index associated with the maximum channel quality information, rank information, and remaining channel quality information associated the rank information, and generating feedback information depending on the determined maximum channel quality information, antenna group index, rank information, and remaining channel quality information; and a transmitter for transmitting the feedback information to a transmission apparatus.

According to further another aspect of exemplary embodiments of the present invention, there is provided a method for transmitting data in a closed-loop multi-antenna system that defines multiple antenna groups by antenna grouping on multiple antennas, and performs data transmission individually via each of the multiple antenna groups. The data transmission method includes receiving, from multiple reception apparatuses, feedback information including maximum channel quality information, an antenna group index associated with the maximum channel quality information, rank information, and remaining channel quality information; calculating a sum rate (R_MU) in a multi-user mode based on the maximum channel quality information and the antenna group index, provided as feedback information from each reception apparatus; calculating a sum rate (R_SU) in a single-user mode based on the rank information, the remaining channel quality information, and the maximum channel quality information, provided as feedback information from each reception apparatus; selecting one of the single-user mode and the multi-user mode as a transmission mode depending on a comparison result between the sum rate (R_MU) in the multi-user mode and the sum rate (R_SU) in the single-user mode; and transmitting a data stream according to the selected transmission mode.

According to yet another aspect of exemplary embodiments of the present invention, there is provided an apparatus for transmitting data in a closed-loop multi-antenna system that defines multiple antenna groups by antenna grouping on multiple antennas, and performs data transmission individually via each of the multiple antenna groups. The data transmission apparatus includes a feedback information processor for receiving, from multiple reception apparatuses, feedback information including maximum channel quality information, an antenna group index associated with the maximum channel quality information, rank information, and remaining channel quality information, selecting one of a single-user mode and a multi-user mode as a transmission mode depending on the feedback information, and performing control according to the selected transmission mode; and a transmitter for receiving a data stream to be transmitted to each reception apparatus, and transmitting the data stream according to one of the multi-user mode and the single-user mode under control of the feedback information processor.

According to still another aspect of exemplary embodiments of the present invention, there is provided a closed-loop multi-antenna system that defines multiple antenna groups by antenna grouping on multiple antennas, and performs data transmission individually via each of the multiple antenna groups. The closed-loop multi-antenna system includes a reception apparatus for transmitting feedback information associated with a data stream transmitted individually for each antenna group; and a transmission apparatus for transmitting a data stream individually via each antenna group according to a transmission mode determined depending on the feedback information from the reception apparatus. The reception apparatus includes a channel estimator for acquiring, from a received signal, channel quality information for each data stream transmitted individually via each antenna group; a feedback information generator for determining, from the channel quality information acquired individually for each antenna group, maximum channel quality information, an antenna group index associated with the maximum channel quality information, rank information, and remaining channel quality information associated the rank information, and generating feedback information depending on the determined maximum channel quality information, antenna group index, rank information, and remaining channel quality information; and a transmitter for transmitting the feedback information to a transmission apparatus. The transmission apparatus includes a feedback information processor for receiving, from multiple reception apparatuses, feedback information including maximum channel quality information, an antenna group index associated with the maximum channel quality information, rank information, and remaining channel quality information, selecting one of a single-user mode and a multi-user mode as a transmission mode depending on the feedback information, and performing control according to the selected transmission mode; and a transmitter for receiving a data stream to be transmitted to each reception apparatus, and transmitting the data stream according to one of the multi-user mode and the single-user mode under control of the feedback information processor.

BRIEF DESCRIPTION OF THE DRAWINGS

The above and other aspects, features and advantages of certain embodiments of the present invention will become more apparent from the following detailed description taken in conjunction with the accompanying drawings, in which.

Throughout the drawings, the same drawing reference numerals will be understood to refer to the same elements, features, and structures.

DETAILED DESCRIPTION OF EXEMPLARY EMBODIMENTS

The matters defined in the description such as a detailed construction and elements are provided to assist in a comprehensive understanding of the embodiments of the invention and are merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

Preferred embodiments of the present invention will now be described in detail with reference to the annexed drawings.

A reception apparatus proposed by an exemplary embodiment of the present invention, described below, generates feedback information including the best channel quality information out of channel quality information associated with each data stream group, an index of a data stream group associated with the best channel quality information, the number (or RANK value) of activated transmission stream groups, which is information additionally needed for a flexible SU mode, and channel quality information based on the number (RANK value) of activated transmission stream groups. The index of the data stream group is information necessary during base station scheduling for supporting the MU mode. The flexible SU mode can be defined including both a transmission mode for transmitting a data stream associated with one user via one antenna group and a transmission mode for transmitting the data stream via multiple antenna groups. Therefore, in an exemplary embodiment of the present invention described below, the SU mode should be construed as the above-defined flexible SU mode.

It can be assumed that for generation of a channel quality value for the MU mode and generation of a channel quality value for the flexible SU mode, the reception apparatus can use either the same receiver or different receivers according to its own conditions. For example, it can be assumed that the reception apparatus can use a linear receiver for generation of a channel quality value for the MU mode, and a nonlinear receiver, such as Successive Interference Cancellation (SIC) receiver and Modified Maximum Likelihood (ML) receiver, for generation of a channel quality value for the flexible SU mode.

A detailed description will be made herein of a multi-antenna system supporting both the SU mode and the MU mode based on antenna grouping. Further, a detailed description will be made of a structure and operation of a reception apparatus for generating and transmitting feedback information according to a data stream transmitted by means of antenna grouping, and a detailed description will also be made of a structure and operation of a transmission apparatus for transmitting a data stream via an antenna group grouped by means of a transmission mode determined based on the feedback information.

A. Multi-Antenna System

Figure 1:
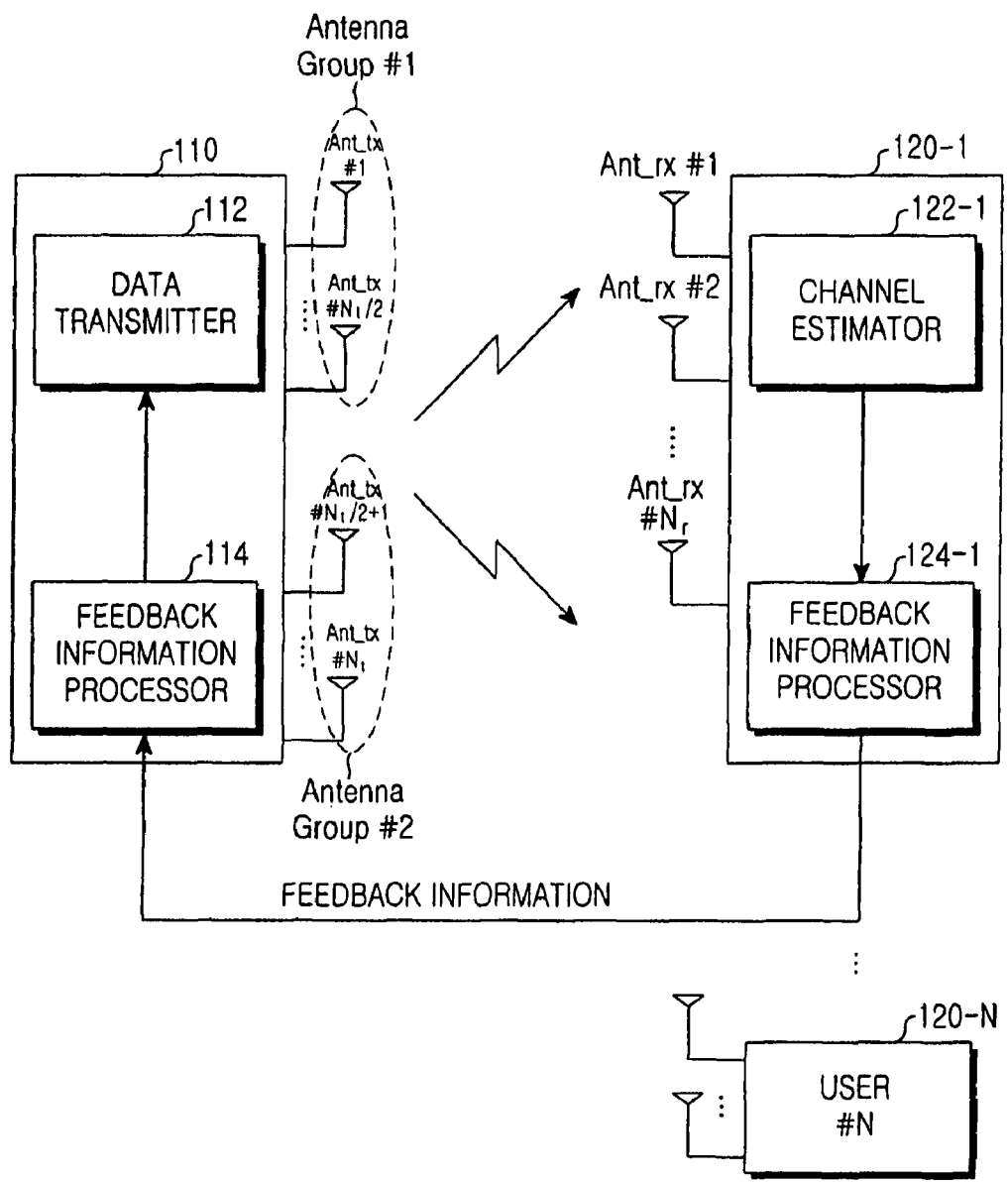
FIG. 1 is a diagram illustrating a closed-loop multi-antenna system according to an embodiment of the present invention.

FIG. 1 illustrates a closed-loop multi-antenna system according to an exemplary embodiment of the present invention. The multi-antenna system shown in FIG. 1 includes one transmission apparatus 110 and multiple reception apparatuses 120-1 and 120-N. The transmission apparatus 110 can be assumed to be a base station, and the multiple reception apparatuses 120-1 and 120-N each can be assumed to be user terminals. The following description will be made with reference to one reception apparatus 120-1, and the same can be applied to the other reception apparatuses.

Referring to FIG. 1, the transmission apparatus 110 includes $N_t$ antennas, and the reception apparatus 120-1 includes $N_r$ antennas. The $N_t$ antennas included in the transmission apparatus 110 are grouped by a predetermined number of antennas. This is called 'antenna grouping', and an antenna bundle obtained by the grouping is called an 'antenna group'. However, a multi-antenna system using a preceding matrix can apply grouping for columns, and grouping for beams. In this case, the present invention can be implemented by means of "column group" or "beam group" rather than the "antenna group". Therefore, the "antenna group" as used herein should be construed to include the "column group" and the "beam group". For convenience, the number of antenna groups herein is assumed to be 2. Therefore, each antenna group is composed of $N_t/2$ antennas.

The transmission apparatus 110 transmits a data stream for each user via an antenna group based on feedback information provided from the reception apparatus 120-1. That is, the transmission apparatus 110 determines a transmission mode for transmitting the data stream depending on the feedback information. The transmission mode is classified into the SU mode and the MU mode. The SU mode is divided into two transmission modes depending on rank information. In addition, the transmission apparatus 110 determines a Modulation & Coding Selection (MCS) level depending on the feedback information. The data streams transmitted via multiple antennas constituting the antenna group will be referred to herein as a 'data stream group'.

The reception apparatus 120-1 receives a signal via at least one antenna, and estimates a channel characteristic for each antenna group (or data stream group) through channel estimation on the received signal. The reception apparatus 120-1 acquires Channel Quality Information (CQI) for each antenna group based on the estimated channel characteristic. The CQI is a value based on which channel quality between each antenna group and each reception antenna can be estimated.

In addition, the reception apparatus 120-1 generates feedback information based on channel quality information associated with each antenna group. The feedback information includes a maximum CQI, an antenna group index associated with the maximum CQI, rank information, and a Remain CQI associated with the rank information. The rank information is a value designating the number of antenna groups via which the reception apparatus 120-1 will transmit a data stream to one user in the SU mode. If the rank information is '1', it indicates a request for transmission of a data stream for one user via one antenna group. If the rank information is '2', it indicates a request for transmission of a data stream for one user via two antenna groups.

The transmission apparatus 110 determines a transmission mode depending on feedback information provided from each of the reception apparatuses 120-1 and 120-N. That is, the transmission apparatus 110 can selectively use the SU mode and the MU mode.

To this end, the reception apparatus 120-1 includes at least one reception antenna Ant_rx #1, Ant_rx #2, ..., Ant_rx #$N_r$, ..., a channel estimator 122-1, and a feedback information generator 124-1. The transmission apparatus 110 includes multiple transmission antennas (Ant_tx #1, Ant_tx #2, ..., Ant_tx #$N_t$), a feedback information processor 114, and a data transmitter 112.

Regarding the reception apparatus 120-1, a signal received from at least one reception antenna Ant_rx #1, Ant_rx #2, ..., Ant_rx #$N_r$ is input to the channel estimator 122-1.

The channel estimator 122-1 estimates a channel characteristic for each of all channels (i.e. data stream groups or antenna groups) over which the signal is transmitted. In addition, based on the estimated channel characteristic, the channel estimator 122-1 calculates CQI information associated with each of the data stream groups transmitted via each antenna group by means of a predetermined signal detection technique.

The signal detection technique is classified into a linear detection technique and a nonlinear detection technique. A Minimum Mean Square Error (MMSE) technique can be a typical example of the linear detection technique, and an SIC technique can be a typical example of the nonlinear detection technique. An exemplary embodiment of the present invention will be described with reference to the MMSE technique, the SIC technique, and a beam-forming technique.

The channel estimator 122-1 can selectively use the MMSE technique, the SIC technique, and the beam-forming technique. The channel estimator 122-1 provides CQI information of each antenna group estimated by the MMSE technique, CQI information of each antenna group measured by the SIC technique, and CQI information of each antenna group measured by the beam-forming technique, to the feedback information generator 124-1.

The feedback information generator 124-1 generates feedback information depending on the CQI information for each antenna group provided from the channel estimator 122-1. The function of the channel estimator 122-1 for acquiring CQI information by means of the various signal detection techniques can also be implemented to be performed in the feedback information generator 124-1.

The feedback information, as stated above, includes a maximum CQI, antenna group index associated with the maximum CQI, rank information, and a Remain CQI associated with the rank information. The maximum CQI is the best CQI among the CQIs acquired for each antenna group. The rank information corresponds to the number of antenna groups. For example, if the number of antenna groups is assumed to be 2, the rank information can be '1' or '2'. The Remain CQI can be differently defined according to the rank information. For example, if the rank information is '1', the Remain CQI is CQI that can be obtained for the remaining data stream group after turning off an antenna group (or data stream group) having the minimum CQI by means of the beam-forming technique. If the rank information is '2', the Remain CQI is CQI that can be obtained for the remaining antenna group (or data stream group) after removing the maximum CQI by means of the SIC technique.

The reception apparatus 120-1 transmits the feedback information generated by the feedback information generator 124-1 to the transmission apparatus 110. Preferably, the transmission of the feedback information is periodically performed by the reception apparatus 120-1. However, if the transmission time is previously agreed upon between the transmission apparatus 110 and the reception apparatus 120-1, the feedback information can be aperiodically transmitted.

Regarding the transmission apparatus 110, the feedback information received from all the reception apparatuses 120-1 and 120-N is provided to the feedback information processor 114. The feedback information processor 114 determines a transmission mode, a coding technique, and an MCS level based on the feedback information received from each reception apparatus.

The feedback information processor 114 calculates a sum rate (R_MU) in the MU mode and a sum rate (R_SU) in the SU mode to determine the transmission mode. The calculation of the R_MU and the R_SU is made depending on the feedback information. In addition, the feedback information processor 114 determines a coding technique and an MCS level for supporting the determined transmission mode.

The data transmitter 112 transmits, via an antenna group, at least one user data stream selected depending on the transmission mode, the coding technique, and the MCS level provided by the feedback information processor 114.

B. Structure and Operation of Reception Apparatus

Figure 2:
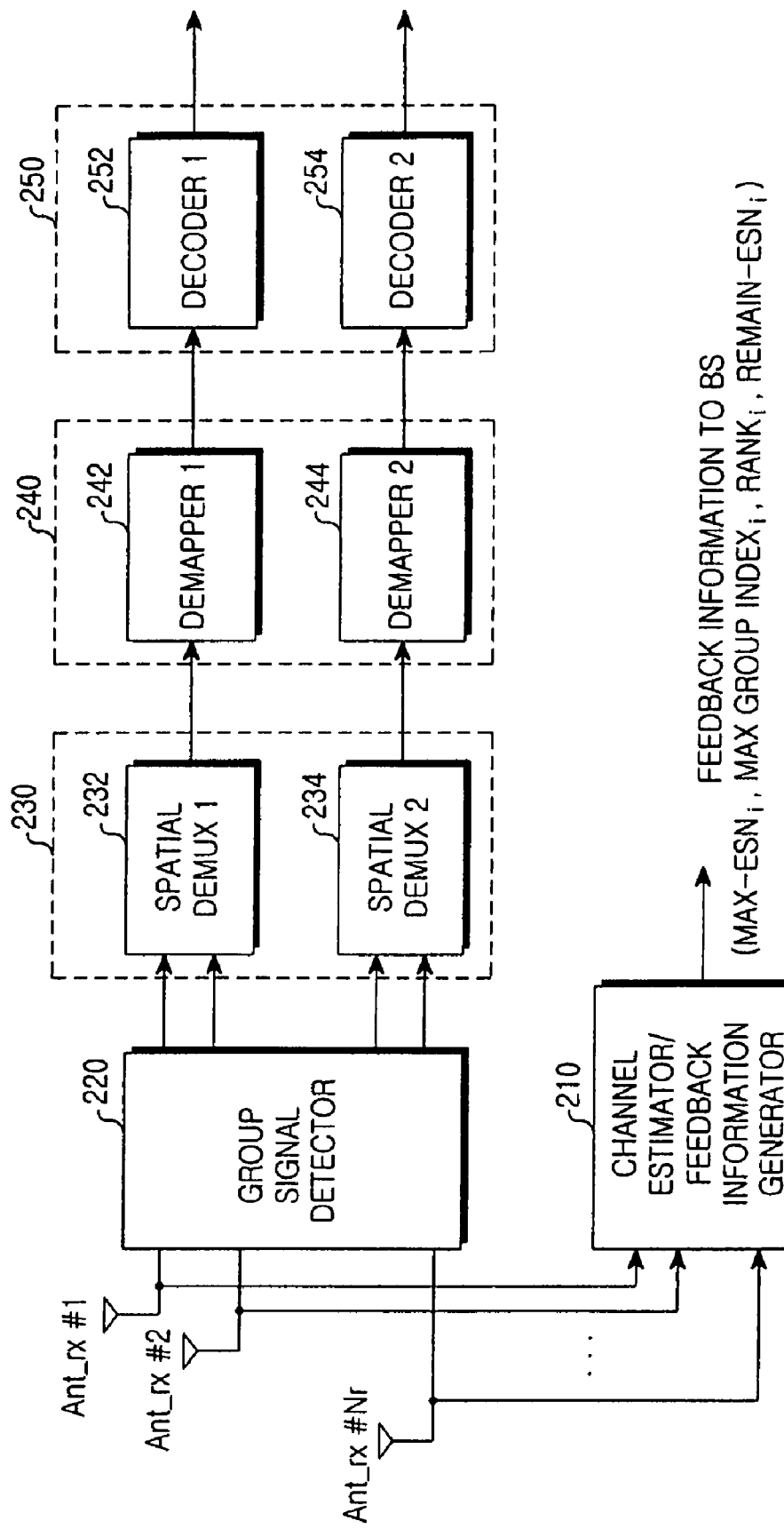
FIG. 2 is a diagram illustrating an example of a detailed structure of a reception apparatus according to an embodiment of the present invention.

FIG. 2 illustrates an example of a detailed structure of a reception apparatus according to an exemplary embodiment of the present invention. It is assumed in FIG. 2 that two data stream groups are transmitted, that is data streams are transmitted from a transmission apparatus via two antenna groups.

Referring to FIG. 2, a signal received via $N_R$ antennas is provided to a channel estimator & feedback information generator 210 and a group signal detector 220.

The group signal detector 220 detects multiple data streams from the received signal by applying a predetermined signal detection technique. The predetermined signal detection technique can be any one of a nonlinear signal detection technique and a linear signal detection technique. The SIC technique can be applied as an example of the predetermined signal detection technique. The multiple data streams, data streams transmitted via an antenna group of a transmitting entity (or the transmission apparatus), are classified into two data stream groups. However, when the data streams are transmitted by the transmitting entity by means of the beam-forming technique, the multiple data streams can be classified into one data stream group. The beam-forming technique corresponds to a signal transmission technique for transmitting data streams via one antenna group in a concentrated manner.

The multiple data streams detected by the group signal detector 220 are provided to a spatial demultiplexing block 230. The spatial demultiplexing block 230 demultiplexes the multiple data streams separately for each data stream group, and outputs a data stream associated with each data stream group.

To this end, the spatial demultiplexing block 230 can be composed of a spatial demultiplexer associated with each antenna group (i.e. each data stream group). In FIG. 2, because the number of antenna groups is assumed to be 2, the spatial demultiplexing block 230 is composed of two spatial demultiplexers 232 and 234. Therefore, the spatial demultiplexers 232 and 234 each demultiplex the multiple data streams provided from the group signal detector 220, and output one data stream corresponding to a unique data stream group.

The data stream of each data stream group, output from the spatial demultiplexing block 230, is provided to a demodulation block 240. The demodulation block 240 performs demodulation on the data stream provided separately for each data stream group.

The demodulation block 240 is composed of multiple demappers 242 and 244 associated with each data stream group. The multiple demappers 242 and 244 each perform demodulation, that is demapping, on the data streams provided from their associated spatial demultiplexers 232 and 234, and output demodulated data streams.

The demodulated multiple data streams output from the demodulation block 240 are provided to a decoding block 250. The decoding block 250 performs decoding on the demodulated data streams for each data stream group by means of a predetermined decoding technique. A turbo decoding technique can be used as an example of the predetermined decoding technique.

The decoding block 250 is composed of multiple decoders 252 and 254 associated with each data stream group. The multiple decoders 252 and 254 each perform decoding on the demodulated data streams provided from their associated demappers 242 and 244.

The channel estimator & feedback information generator 210 estimates a channel characteristic associated with each data stream group by channel estimation on the received signal provided via the $N_R$ antennas. In addition, the channel estimator & feedback information generator 210 acquires CQI associated with each data stream group based on the channel characteristic estimated separately for each data stream group. The CQI can be represented by an Effective Signal-to-Noise Ratio (ESN). In the following description, the CQI and the ESN will be used together. Nevertheless, application of an exemplary embodiment of the present invention shall not be limited to the CQI or ESN. Meanwhile, various signal detection techniques can be used to acquire an ESN from the channel characteristic. An exemplary embodiment of the present invention uses the MMSE technique, the SIC technique, and the beam-forming technique.

In addition, the channel estimator & feedback information generator 210 generates feedback information based on the $ESN_j$ (where j is a data stream group index or an antenna group index) acquired separately for each data stream group. The feedback information includes a maximum ESN (MAX-ESN), an antenna group index (MAX group index) associated with the MAX-ESN, rank information (RANK), and a Remain ESN (Remain-ESN) associated with the rank information. The MAX-ESN is the best ESN among the ESNs acquired separately for each data stream group, and the MAX group index is an antenna group index (i.e. data stream group index) of the MAX-ESN. In addition, the rank information, indicative of the number of data streams (i.e. the number of data stream groups) transmitted by the transmitting entity via an antenna group, is information used for determining a transmission mode of the transmitting entity. The Remain-ESN can be acquired by means of a signal detection technique designated individually for each rank information.

For example, the channel estimator & feedback information generator 210 estimates an ESN associated with each data stream group by applying three different signal detection techniques. That is, the channel estimator & feedback information generator 210 acquires a MAX-ESN and a MAX group index depending on the best $MMSE-ESN_{m\_best}$ among the ESNs (MMSE-ESNs) estimated by means of a first signal detection technique among the three signal detection techniques. The MMSE technique can be used as the first signal detection technique, which is a linear detection technique.

Further, the channel estimator & feedback information generator 210 acquires an $ESN_n$ ($SIC-ESN_n$, where n is different from m_best) associated with a particular data stream group by means of a second signal detection technique available for rank information='2' among the three signal detection techniques. The SIC technique can be used as the second signal detection technique, which is a nonlinear detection technique.

In addition, the channel estimator & feedback information generator 210 acquires an $ESN_n$ ($OFF-ESN_n$, where n is different from m_best) associated with a particular data stream group by means of a third signal detection technique (for example, the beam-forming technique) available for rank information='1' among the three signal detection techniques. The beam-forming technique can be used as the third signal detection technique. The beam-forming technique turns off the remaining antenna groups except for one antenna group among the antenna groups, and performs channel estimation only on the data stream transmitted via the one non-turned-off antenna group. The turned-off data stream group corresponds to the data stream group having the minimum channel quality.

Further, the channel estimator & feedback information generator 210 determines one of the $SIC-ESN_n$ and the $OFF-ESN_n$ as a Remain-ESN. For example, the channel estimator & feedback information generator 210 determines, as a Remain-ESN, an ESN capable of obtaining a higher rate among a rate ($R_{SIC}$) calculated depending on the SIC -$ESN_n$, and a rate ($R_{OFF}$) calculated depending on the $OFF-ESN_n$. The channel estimator & feedback information generator 210 further considers the MAX-ESN for calculation of the $R_{SIC}$. The channel estimator & feedback information generator 210 determines, as rank information, a rank value associated with the signal detection technique used for acquiring the ESN determined as the Remain-ESN.

A detailed description of an operation of the channel estimator & feedback information generator 210 for acquiring the feedback information will be made in the description of an operation of the reception apparatus. Although the structure for channel estimation and the structure for generating feedback information are united in a single structure in FIG. 2, they can be implemented with separate structures.

Figure 3:
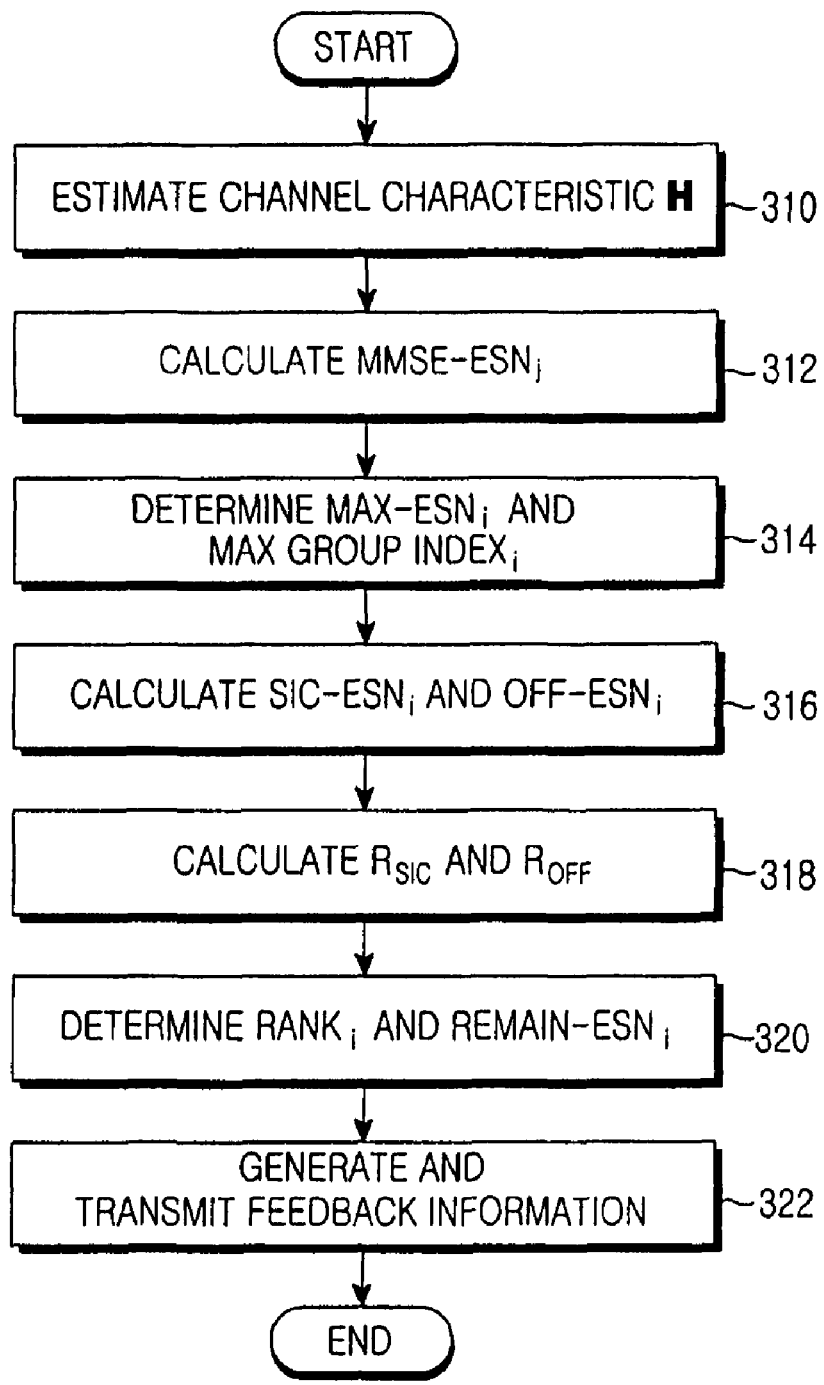
FIG. 3 is a diagram illustrating an exemplary operation of a reception apparatus for generating feedback information according to an embodiment of the present invention.

FIG. 3 illustrates an exemplary operation of a reception apparatus for generating feedback information according to an embodiment of the present invention. The operation shown in FIG. 3 can be performed by a channel estimator & feedback information generator in the reception apparatus.

Referring to FIG. 3, in step 310, a reception apparatus estimates a channel characteristic H associated with each antenna included in a transmitting entity from a signal received via antennas. That is, if the number of antennas in the transmitting entity is assumed to be $N_T$, the channel characteristic H can be defined as $[h_1, h_2, \ldots, h_{NT}]$.

In step 312, the reception apparatus calculates an $MMSE-ESN_j$ of each antenna group by means of the MMSE technique based on the estimated channel characteristic H. In step 314, the reception apparatus selects, as a MAX-ESN, the best MMSE-ESN from among the $MMSE-ESN_j$ calculated for each antenna group, and selects, as a MAX group index, an antenna group index associated with the selected MAX-ESN.

Thereafter, in step 316, the reception apparatus calculates an SIC-ESN and an OFF-ESN. That is, the reception apparatus calculates the SIC-ESN by means of the SIC technique based on the estimated channel characteristic H. In addition, the reception apparatus calculates the OFF-ESN by means of the beam-forming technique based on the estimated channel characteristic H. The SIC-ESN is calculated for one of the antenna groups, and the antenna group index associated with the SIC-ESN is different from the MAX group index. The OFF-ESN is calculated for one of the antenna groups, and the antenna group index associated with the OFF-ESN is different from the antenna group index associated with the SIC-ESN.

In step 318, the reception apparatus calculates a rate $R_{SIC}$ that it can obtain when applying the SIC technique, and a rate $R_{OFF}$ that it can obtain when applying the beam-forming technique. For the calculation of the $R_{SIC}$, the MAX-ESN and the SIC-ESN are used, and for the calculation of the $R_{OFF}$, the OFF-ESN is used.

In step 320, the reception apparatus determines a RANK and a Remain-ESN, each corresponding to the feedback information. For the Remain-ESN, the reception apparatus compares the $R_{SIC}$ with the $R_{OFF}$, and selects a higher one of them. Further, the reception apparatus checks a signal detection technique associated with the selected rate, and determines, as a Remain-ESN, the ESN calculated for the checked signal detection technique. The RANK is determined according to the determined Remain-ESN. The RANK is previously designated for the signal detection technique.

For example, if the $R_{SIC}$ is higher than the $R_{OFF}$, the reception apparatus determines the SIC-ESN as a Remain-ESN, and determines '2' associated with the SIC technique as a RANK value. However, if $R_{OFF}$ is higher than the $R_{SIC}$, the reception apparatus determines the OFF-ESN as a Remain-ESN, and determines '1' associated with the beam-forming technique as a RANK value.

In step 322, the reception apparatus generates feedback information. The feedback information includes the MAX-ESN and the MAX group index determined in step 314, and the RANK and the Remain-ESN determined in step 320. Further, the reception apparatus transmits the feedback information to the transmission apparatus.

Figure 4:
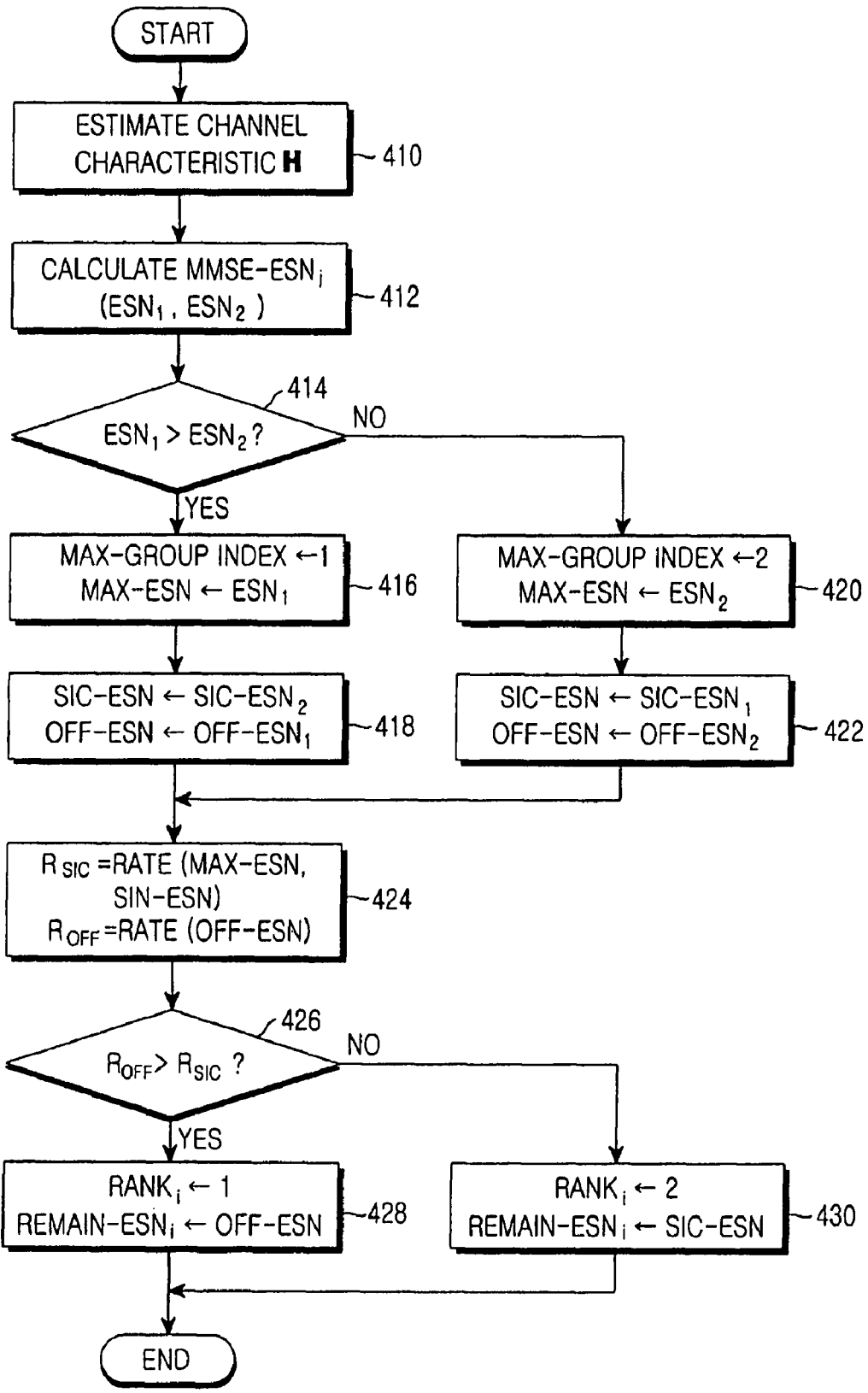
FIG. 4 is a diagram illustrating an operation performed in a reception apparatus with, for example, two antenna groups according to an embodiment of the present invention.

FIG. 4 illustrates an operation performed in a reception apparatus with, for example, two antenna groups according to an exemplary embodiment of the present invention.

Referring to FIG. 4, in step 410, a reception apparatus estimates a channel characteristic H associated with each antenna included in a transmitting entity from a signal received via antennas. That is, if the number of antennas in the transmitting entity is assumed to be $N_T$, the channel characteristic H can be defined as $[h_1, h_2, \ldots, h_{NT}]$.

In step 412, the reception apparatus calculates an MMSE-$ESN_1$ and an MMSE-$ESN_2$ by means of the MMSE technique based on the estimated channel characteristic H. The MMSE-$ESN_1$ associated with a first antenna group can be calculated by Equation (1), and the MMSE-$ESN_2$ associated with a second antenna group can be calculated by Equation (2).

$$f_r(\rho_g, 1) = \sum_{m=1}^{N_T/2} f_r(\rho_m) \quad (1)$$

$$f_r(\rho_g, 2) = \sum_{m=(N_T/2)+1}^{N_T} f_r(\rho_m) \quad (2)$$

Herein, $\rho_m$ denotes a CQI estimated for an $m^{th}$ transmission antenna, and a capacity function can be defined as $f_r(\rho)=\log_2(1+\Gamma\rho)$, where $\Gamma$ denotes a performance difference between the actual processing performance and the Shannon capacity.

As defined in Equation (1) and Equation (2), the CQI associated with each antenna group is calculated by a sum of CQIs of the individual antennas constituting each antenna group.

The $\rho_m$ by the MMSE technique is calculated by Equation (3).

$$\rho_m = h_m^H \left( \sum_{l \neq m} h_l h_l^H + \frac{4}{SNR} I \right) h_m \quad (3)$$

In step 414, the reception apparatus decides a better MMSE-ESN from among the MMSE-$ESN_1$ and the MMSE-$ESN_2$. That is, the reception apparatus determines whether the MMSE-$ESN_1$ is greater than the MMSE-$ESN_2$. If the MMSE-$ESN_1$ is greater than the MMSE-$ESN_2$, the reception apparatus proceeds to step 416.

In step 416, the reception apparatus sets the MAX group index to '1' indicating the first antenna group, and sets the MAX-ESN to MMSE-$ESN_1$.

In the above-described manner, the reception apparatus calculates an MMSE-ESN in association with each antenna group and a mapping relationship between the MAX-ESN set by the calculated MMSE-ESN. The MAX group index is shown in Table 1.

TABLE 1

| antenna group index | calculated ESN |
| --- | --- |
| Group 1 | MMSE-$ESN_1$ |
| Group 2 | MMSE-$ESN_2$ |
| MAX-ESN | MMSE-$ESN_1$ |
| MAX group index | 1 |

In step 418, the reception apparatus calculates an SIC-$ESN_2$ and an OFF-$ESN_1$, and sets them to SIC-ESN and OFF-ESN, respectively. To calculate SIC-ESN, the reception apparatus should first detect the data stream transmitted by the first antenna group (an antenna group corresponding to the MAX group index). The reason is because MMSE-$ESN_1$ is set to MAX-ESN. In addition, the reception apparatus acquires an ESN (SIC-$ESN_2$) associated with the data stream transmitted by the second antenna group from the received signal from which the data stream component transmitted by the first antenna group is removed. To acquire the OFF-$ESN_1$, the reception apparatus turns off the antennas belonging to the second antenna group, and acquires an ESN (OFF-$ESN_1$) associated with the data stream transmitted by the first antenna group.

However, if MMSE-$ESN_2$ is greater than the MMSE-$ESN_1$ in step 414, the reception apparatus proceeds to step 420. It is provided in FIG. 4 that if the MMSE-$ESN_1$ is equal to the MMSE-$ESN_2$, the reception apparatus proceeds to step 420. Alternatively, however, if the MMSE-$ESN_1$ is equal to the MMSE-$ESN_2$, the reception apparatus can be implemented to proceed to step 416.

In step 420, the reception apparatus sets the MAX group index to '2' indicating the second antenna group, and sets the MAX-ESN to MMSE-$ESN_2$.

In the above-described manner, the reception apparatus calculates an MMSE-ESN in association with each antenna group and a mapping relationship between the MAX-ESN set by the calculated MMSE-ESN. The MAX group index is shown in Table 2.

TABLE 2

| antenna group index | calculated ESN |
| --- | --- |
| Group 1 | MMSE-$ESN_1$ |
| Group 2 | MMSE-$ESN_2$ |
| MAX-ESN | MMSE-$ESN_2$ |
| MAX group index | 2 |

In step 422, the reception apparatus calculates an SIC-$ESN_1$ and an OFF-$ESN_2$, and sets them to SIC-ESN and OFF-ESN, respectively. To calculate the SIC-ESN, the reception apparatus should first detect the data stream transmitted by the second antenna group (an antenna group corresponding to the MAX group index). The reason is because the MMSE-$ESN_2$ is set to MAX-ESN. Further, the reception apparatus acquires as ESN (SIC-$ESN_1$) associated with the data stream transmitted by the first antenna group from the received signal from which the data stream component transmitted by the second antenna group is removed. To acquire the OFF-$ESN_2$, the reception apparatus turns off the antennas belonging to the first antenna group, and acquires an ESN (OFF-ESN$_2$) associated with the data stream transmitted by the second antenna group.

A further detailed description will now be made of an operation of calculating the SIC-ESN and the OFF-ESN.

The reception apparatus calculates the SIC-ESN assuming that the rank is 2, and calculates the OFF-ESN assuming that the rank is 1. On this consumption, the SIC-ESN and the OFF-ESN can be calculated by Equation (4).

$$\rho_{g,min}^{Remain} = \begin{cases} \rho_{g,I_{g,min}}^{BF}, & \text{if } r = 1 \\ \rho_{g,I_{g,max}}^{SIC}, & \text{if } r = 2 \end{cases} \quad (4)$$

where $I_{g,min} = \arg\min\{\rho_{g,1}, \rho_{g,2}\}$, and $\rho_{g,min}^{Remain}$ denotes a Remain-ESN.

The $\rho_{g,m}^{BF}$ calculated by Equation (4) is an SINR received by means of the beam forming (BF) technique, and can be expressed as Equation (5) for m=1 and 2.

$$f_r(\rho_{g,m}^{BF}) = \sum_{l=2m-1}^{2m} f_r(\rho_l^{BF}) \quad (5)$$

where $\rho_m^{BF}$ denotes a CQI of an $m^{th}$ transmission antenna to which beam-forming is applied.

The $\rho_m^{BF}$ is calculated by Equation (6).

$$\rho_m^{BF} = h_m^H \left( \sum_{l \neq m, l \in A_l} h_l h_l^H + \frac{2}{SNR} I \right) h_m \quad (6)$$

where $$A_l = \left\{ 2\left\lceil \frac{l+1}{2} \right\rceil - 1, 2\left\lceil \frac{l+1}{2} \right\rceil \right\}.$$

In addition, the $\rho_{g,m}^{SIC}$ in Equation (4) is an SINR received by means of the SIC technique, can be expressed as Equation (7) for m=1 and 2.

$$f_r(\rho_{g,m}^{GSIC}) = \sum_{l=2m-1}^{2m} f_r(\rho_l^{GSIC}) \quad (7)$$

where $\rho_m^{GSIC}$ denotes a CQI calculated for an $m^{th}$ antenna group after removing the signal transmitted by the remaining antenna group except for the $m^{th}$ antenna group.

The $\rho_m^{GSIC}$ is calculated by Equation (8).

$$\rho_m^{GSIC} = h_m^H \left( \sum_{l \neq m, l \in A_l} h_l h_l^H + \frac{4}{SNR} I \right) h_m \quad (8)$$

After acquiring the SIC-ESN and the OFF-ESN in step 418 and/or step 422, the reception apparatus proceeds to step 424 where it calculates a rate $R_{SIC}$ that it can obtain when applying the SIC technique, and a rate $R_{OFF}$ that it can obtain when applying the beam-forming technique. The $R_{SIC}$ sic and the $R_{OFF}$ can be calculated by Equation (9).

$$R_{BF} = f_r(\rho_{g,1_{g,max}}^{BF}) \quad R_{GSIC} = f_r(\rho_{g,1_{g,max}}^{GSIC}) + f_r \\ (\rho_{g,1_{g,min}}^{GSIC}) \quad (9)$$

In step 426, the reception apparatus determines whether the $R_{OFF}$ is higher than the $R_{SIC}$. If the $R_{OFF}$ is higher than the $R_{SIC}$, it means that transmitting the data stream by means of the beam-forming technique is superior in terms of the transmission efficiency. Otherwise, if the $R_{SIC}$ is higher than the $R_{OFF}$, transmitting the data stream by means of the SIC technique is superior in terms of the transmission efficiency.

If the $R_{OFF}$ is higher than the $R_{SIC}$, the reception apparatus proceeds to step 428. However, if the $R_{SIC}$ is higher than the $R_{OFF}$, the reception apparatus proceeds to step 430. It is provided in FIG. 4 that if the $R_{OFF}$ is equal to the $R_{SIC}$, the reception apparatus proceeds to step 430. Alternatively, however, if the $R_{OFF}$ is equal to the $R_{SIC}$, the reception apparatus can be implemented to proceed to step 428.

In step 429, the reception apparatus sets the rank information to a value '1' corresponding to the use of the beam-forming technique, and sets the Remain-ESN to the calculated OFF-ESN. Otherwise, in step 430, the reception apparatus sets the rank information to a value '2' corresponding to the use of the SIC technique, and sets the Remain-ESN to the calculated SIC-ESN.

In the above-described manner, the reception apparatus acquires the MAX-ESN, the MAX group index, the RANK, and the Remain-ESN, generates feedback information depending on the acquired MAX-ESN, MAX group index, RANK and Remain-ESN, and transmits the feedback information to the transmission apparatus.

C. Structure and Operation of Transmission Apparatus

Figure 5:
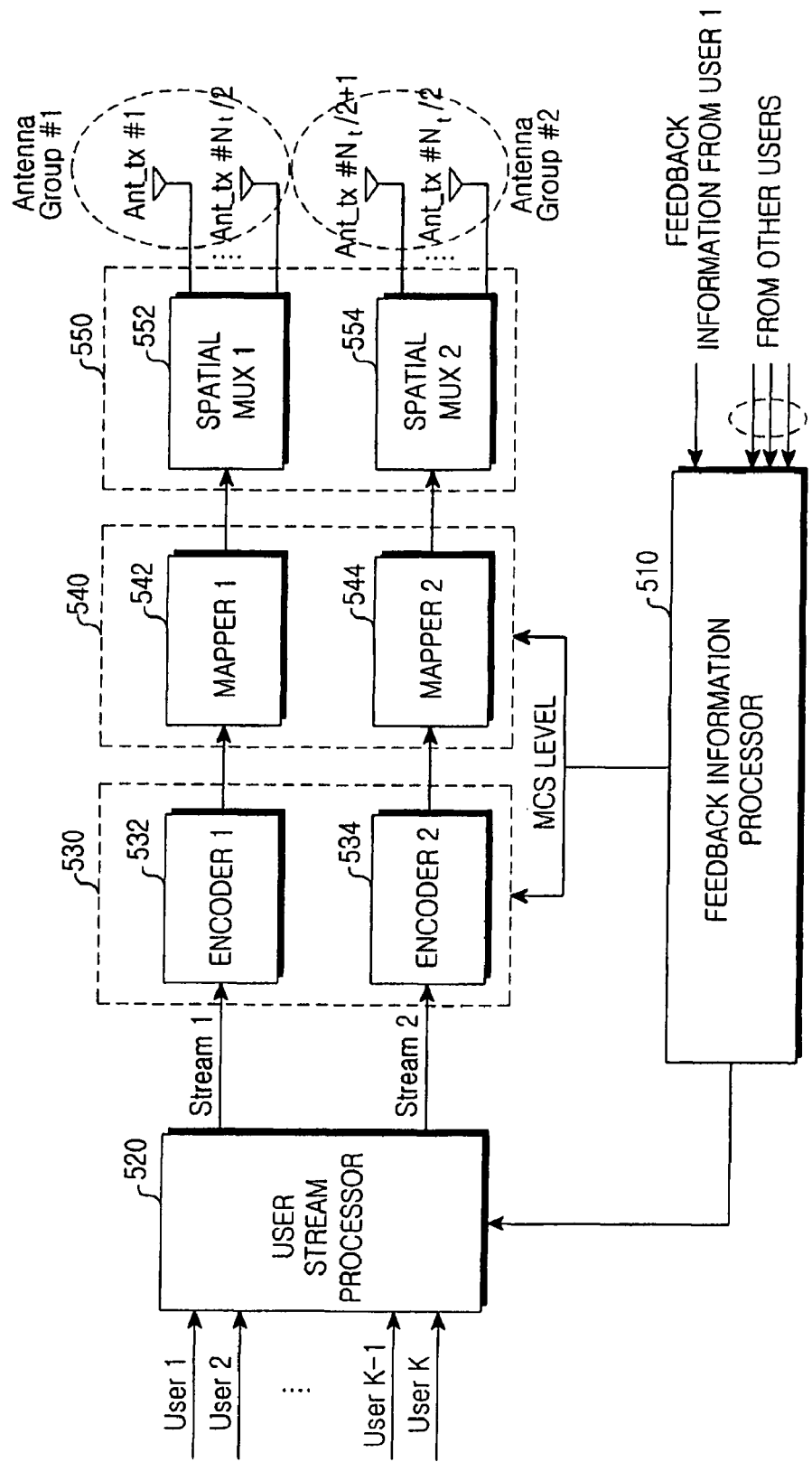
FIG. 5 is a diagram illustrating an example of a detailed structure of a transmission apparatus according to an embodiment of the present invention.

FIG. 5 illustrates an example of a detailed structure of a transmission apparatus according to an exemplary embodiment of the present invention.

Referring to FIG. 5, a feedback information processor 510 receives feedback information from all reception apparatuses and controls the overall operation of transmitting data streams depending on the feedback information.

More specifically, the feedback information processor 510 determines a transmission mode, a coding technique, and an MCS level based on the feedback information received from each reception apparatus. The transmission mode is classified into the SU mode and the MU mode.

The feedback information processor 510 calculates an R_MU and an R_SU to determine the transmission mode. The feedback information processor 510 calculates the R_MU depending on a MAX-ESN and a MAX group index in the received feedback information. The feedback information processor 510 calculates the R_SU depending on a RANK, a Remain-ESN, and a MAX-ESN in the received feedback information.

For example, to calculate the R_MU, the feedback information processor 510 should collect a MAX-ESN individually for each antenna group depending on the MAX group index. Further, the feedback information processor 510 selects a best CQI (MAX-ESN$_{i,j}$, where i denotes a user index and j denotes a antenna group index) individually for each antenna group from among the MAX-ESNs collected in association with each antenna group, and calculates the R_MU by the sum of MAX-ESN$_{i,j}$ selected individually for each antenna group.

To calculate the R_SU, the feedback information processor 510 should collect a CQI (MAX-ESN or Remain-ESN) associated with each antenna group taking RANK into account. Further, the feedback information processor 510 calculates a sum rate (R_SU_i, where i denotes a user index) individually for each transmission apparatus based on the CQI collected in association with each antenna group, and calculates the best rate among the R_SU_i as the R_SU.

Thereafter, the feedback information processor 510 compares the R_MU with the R_SU, and selects one of the MU mode and the SU mode as a transmission mode according to the comparison result. For example, if the R_SU is equal to or less than the R_RU, the feedback information processor 510 selects the MU mode as a transmission mode. However, if the R_SU is greater than the R_MU, the feedback information processor 510 selects the SU mode as a transmission mode.

In addition, the feedback information processor 510 determines an MCS level and user scheduling information for supporting the SU mode and/or the MU mode. The user scheduling information is control information used for selecting a user data stream that the transmission apparatus will transmit according to the transmission mode.

A user stream processor 520 receives data associated with each of multiple users User #1 to User #K, groups the data of each user under the control of the feedback information processor 510, and outputs the grouped data as at least one data stream. The user stream processor 520 selects the received user data depending on the transmission mode and the user scheduling information provided from the feedback information processor 510 and outputs the selected data as at least one data stream. If the MU mode is designated, the user stream processor 520 outputs as many user data streams as the number of antenna groups. However, if the SU mode is designated, the user stream processor 520 outputs the selected user data as one data stream.

An encoding block 530 includes as many encoders as the number of antenna groups. In FIG. 5, as the number of antenna groups is assumed to be two, the encoding block 530 is composed to two encoders 532 and 534. The encoding block 530 performs encoding on the at least one data stream provided from the user stream processor 520. In this case, the encoding block 530 takes into account the MCS level provided from the feedback information processor 510. That is, a coding rate in the encoding block 530 is determined depending on the MCS level.

A modulation block 540 modulates the at least one data stream encoded by the encoding block 530 taking the MCS level into consideration. The modulation block 540 is composed of as many mappers as the number of antenna groups. In FIG. 5, as the number of antenna groups is assumed to be two, the modulation block 540 is composed to two mappers 542 and 544.

A spatial multiplexing block 550 is composed of spatial multiplexers 552 and 554 associated with their corresponding antenna groups. The spatial multiplexers 552 and 554 multiplex the modulated data streams provided from the modulation block 540 in association with their antenna groups. The number of data streams output from each of the spatial multiplexers 552 and 554 corresponds to the number of antennas constituting each antenna group. The data streams output from the spatial multiplexers 552 and 554 are each transmitted via their associated antennas.

Although the feedback information processor 510 and the user stream processor 520 are implemented with separate structures in FIG. 5 by way of example, it is also possible to implement to process the operation of the feedback information processor 510 and the operation of the user stream processor 520 by means of a single structure.

Figure 6:
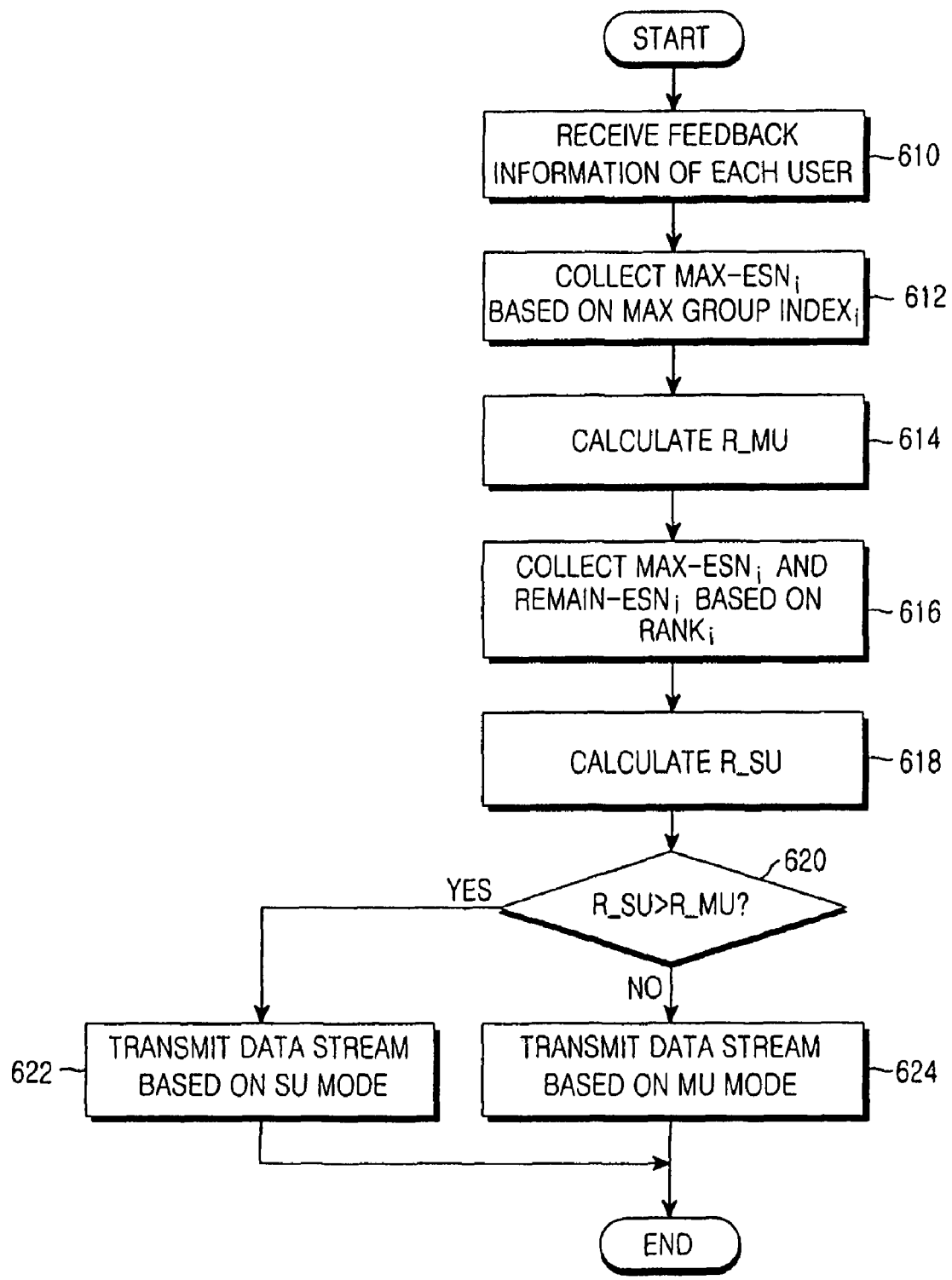
FIG. 6 is a diagram illustrating a control flow performed in a transmission apparatus according to an embodiment of the present invention.

FIG. 6 illustrates a control flow performed in a transmission apparatus according to an exemplary embodiment of the present invention.

Referring to FIG. 6, in step 610, a transmission apparatus receives feedback information transmitted separately for each user. The feedback information includes MAX-$ESN_i$, MAX group $index_i$, $RANK_i$, and Remain-$ESN_i$. Table 3 shows an example of feedback information that the transmission apparatus has received separately for each user. In Table 3, the number of users is assumed to be three, and the number of antenna groups is assumed to be two.

TABLE 3

|  | MAX-$ESN_i$ | MAX group $index_i$ | $RANK_i$ | Remain-$ESN_i$ |
|---|---|---|---|---|
| USER 1 | MAX-$ESN_1$ | 2 | 1 | Remain-$ESN_1$ |
| USER 2 | MAX-$ESN_2$ | 1 | 2 | Remain-$ESN_2$ |
| USER 3 | MAX-$ESN_3$ | 2 | 1 | Remain-$ESN_3$ |

In step 612, the transmission apparatus collects a MAX-$ESN_i$ using a MAX group $index_i$ based on the feedback information received from each user. That is, the transmission apparatus collects the MAX-$ESN_i$ separately for each user (or reception apparatus) taking the MAX group $index_i$ into account.

Table 4 shows an example of MAX-$ESN_{i,j}$ collected by the transmission apparatus that has received the feedback information shown in Table 3.

TABLE 4

|  | USER 1 | USER 2 | USER 3 |
|---|---|---|---|
| GROUP 1 | — | MAX-$ESN_{2,1}$ | — |
| GROUP 2 | MAX-$ESN_{1,2}$ | — | MAX-$ESN_{3,2}$ |
| m_best | 2 | 1 | 2 |

As can be appreciated from Table 4, the transmission apparatus checks MAX-$ESN_i$ and MAX group $index_i$ individually for each user, and maps the checked MAX-$ESN_i$ to the antenna group designated by the MAX group $index_i$. The MAX-$ESN_i$ mapped in this rule is expressed as MAX-$ESN_{i,j}$ taking the antenna group index into consideration, where j denotes an antenna group index. Further, in Table 4, m_best corresponds to the MAX group index checked separately for each user.

For example, MAX-$ESN_1$ received from USER 1 is mapped to MAX-$ESN_{1,2}$ because its MAX group index is '2', and MAX-$ESN_2$ received from USER 2 is mapped to MAX-$ESN_{2,1}$ because its MAX group index is '1'.

In step 614, the transmission apparatus calculates an R_MU depending on the collected information. To this end, the transmission apparatus selects the best MAX-$ESN_{i,j}$ from among MAX-$ESN_{i,j}$ collected separately for each antenna group, and calculates a serviceable rate depending on the MAX-$ESN_{i,j}$ selected individually for each antenna group. The transmission apparatus sets the calculated rate as R_MU.

Table 5 shows an example of R_MU calculated based on the MAX-$ESN_{i,j}$ collected as shown in Table 4.

TABLE 5

|  | USER 1 | USER 2 | USER 3 | Maximum |
|---|---|---|---|---|
| GROUP 1 | — | MAX-$ESN_{2,1}$ | — | MAX-$ESN_{2,1}$ |
| GROUP 2 | MAX-$ESN_{1,2}$ | — | MAX-$ESN_{3,2}$ | MAX-$ESN_{1,2}$ |
| M_best | 2 | 1 | 2 | R_MU |

According to Table 5, MAX-ESN$_{2,1}$ is selected for the first antenna group, and MAX-ESN$_{1,2}$ is selected for the second antenna group. The reason why the MAX-ESN$_{1,2}$ is selected is because the MAX-ESN$_{1,2}$ has higher quality than the MAX-ESN$_{3,2}$. In addition, the transmission apparatus sets, as R_MU, the rate supportable by the MAX-ESN$_{2,1}$ selected for the first antenna group and the MAX-ESN$_{1,2}$ selected for the second antenna group.

In step 616, the transmission apparatus collects MAX-ESN$_i$ and Remain-ESN$_i$ using RANK$_i$ based on the feedback information received from each user. That is, the transmission apparatus collects the MAX-ESN$_i$ and Remain-ESN$_i$ separately for each antenna group taking the RANK$_i$ into account.

Table 6 shows an example of MAX-ESN$_{i,j}$ and Remain-ESN$_i$ collected based on the RANK$_i$ by the transmission apparatus that has received the feedback information shown in Table 3.

TABLE 6

|  | USER 1 (RANK = 1) | USER 2 (RANK = 2) | USER 3 (RANK = 1) |
|---|---|---|---|
| GROUP 1 | OFF | MAX-ESN$_{2,1}$ | Remain-ESN$_{3,1}$ |
| GROUP 2 | Remain-ESN$_{1,2}$ | Remain-ESN$_{2,2}$ | OFF |

As can be appreciated from Table 6, the transmission apparatus collects only the Remain-ESN$_i$ for the user with RANK$_i$=1, and collects MAX-ESN$_{i,j}$ and Remain-ESN$_i$ for the user with RANK$_i$=2. This is because the SU mode by the beam-forming technique is requested for the RANK$_i$=1, and the MU mode by the SIC technique is requested for the RANK$_i$=2. Therefore, the transmission apparatus collects Remain-ESN$_i$ associated with one of two antenna groups for the USER 1 with RANK$_i$=1 and the USER 3 with RANK$_i$=1. Further, the transmission apparatus turns off the remaining antenna group. That is, for USER 1, the transmission apparatus collects Remain-ESN$_{1,2}$ in association with the second antenna group and turns off the first antenna group. For USER 3, the transmission apparatus collects Remain-ESN$_{3,1}$ in association with the first antenna group and turns off the second antenna group.

However, for USER 2 with RANK$_i$=2, the transmission apparatus collects MAX-ESN$_{i,j}$ for one of the two antenna groups and collects Remain-ESN$_{i,j}$ for the remaining antenna group. That is, for USER 2, the transmission apparatus collects MAX-ESN$_{2,1}$ for the first antenna group and collects Remain-ESN$_{2,2}$ for the second antenna group.

Thereafter, in step 618, the transmission apparatus calculates an R_SU depending on the collected information. To this end, the transmission apparatus calculates a serviceable rate R_SU_i depending on the Remain-ESN$_{i,j}$ or MAX-ESN$_{i,j}$ and Remain-ESN$_{i,j}$ collected separately for each user.

Table 7 shows an example of serviceable rates R_SU_1, R_SU_2, and R_SU_3 calculated separately for each user based on the collected information shown in Table 6.

TABLE 7

|  | USER 1 (RANK = 1) | USER 2 (RANK = 2) | USER 3 (RANK = 1) |
|---|---|---|---|
| GROUP 1 | OFF | MAX-ESN$_{2,1}$ | Remain-ESN$_{3,1}$ |
| GROUP 2 | Remain-ESN$_{1,2}$ | Remain-ESN$_{2,2}$ | OFF |
| SUM RATE | R_SU_1 | R_SU_2 | R_SU_3 |

The transmission apparatus compares the rates R_SU_1, R_SU_2, and R_SU_3 calculated individually for each user, and selects the highest one of them. Further, the transmission apparatus sets the selected rate as R_SU.

Table 8 shows an example of setting R_MU on the assumption that among the rates R_SU_1, R_SU_2, and R_SU_3 calculated separately for each user as shown in Table 7, R_SU_3 is the highest rate.

TABLE 8

|  | USER 1 (RANK = 1) | USER 2 (RANK = 2) | USER 3 (RANK = 1) | Maximum |
|---|---|---|---|---|
| GROUP 1 | OFF | MAX-ESN$_{2,1}$ | Remain-ESN$_{3,1}$ | Remain-ESN$_{3,1}$ |
| GROUP 2 | Remain-ESN$_{1,2}$ | Remain-ESN$_{2,2}$ | OFF | OFF |
| SUM RATE | R_SU_1 | R_SU_2 | R_SU_3 | R_SU = R_SU_3 |

In step 620, the transmission apparatus compares the R_MU with the R_SU to determine a supportable transmission mode. That is, the transmission apparatus compares the R_MU with the R_SU and determines a higher rate as a supportable transmission mode.

If the R_SU is higher than the R_MU, the transmission apparatus transmits a data stream of the corresponding user by means of the SU mode in step 622. That is, the transmission apparatus transmits the data stream of the corresponding user via an antenna group associated with the rate set as the R_SU among the multiple antenna groups. Here, the number of antenna groups via which the data stream of the user will be transmitted is determined according to RANK designated by the corresponding user. For example, if RANK is designated as '1', the transmission apparatus transmits the data stream of the corresponding user via one antenna group. In this case, the antennas corresponding to the remaining one antenna group are turned off. However, if RANK is designated as '2', the transmission apparatus transmits the data stream of the corresponding user via two antenna groups. According to Table 8, the transmission apparatus transmits data streams of USER 3 via the first antenna group at the rate R_SU_3.

Otherwise, if the R_MU is higher than the R_SU, the transmission apparatus transmits data streams of the users selected for each antenna group by means of the MU mode in step 624. That is, the transmission apparatus transmits the data streams of the corresponding users via an associated antenna group among the multiple antenna groups. The rate used at this time is a rate capable of supporting MAX-ESN$_{i,j}$ corresponding to each user selected separately for each antenna group. According to Table 5, data streams of USER 2 are transmitted via the first antenna group at the rate capable of supporting MAX-ESN$_{2,1}$, and data streams of USER 1 are transmitted via the second antenna group at the rate capable of supporting MAX-ESN$_{1,2}$.

A description of the operation in which the R_SU is equal to the R_MU has not been provided herein. It is assumed in FIG. 6 that if the R_SU is equal to the R_MU, the transmission apparatus operates in the MU mode. However, the transmission apparatus can also be implemented such that when the R_SU is equal to the R_MU, it operates in the SU mode.

Although an exemplary embodiment of the present invention generates feedback information depending on a data stream of a user and transmits the feedback information, by way of example, exemplary embodiments of the present invention can also be implemented using a signal (for example, a pilot signal) predefined for each user instead of using the data stream of the user. In addition, although the number of antenna groups herein is assumed to be 2, the number of antenna groups is subject to change. In this case, it is necessary to newly define RANK information according to the changed number of antenna group. For example, if an exemplary embodiment of the present invention is implemented with three antenna groups, the RANK information should be defined depending on the information based on which one to three antenna groups can be selected. In addition, exemplary embodiments of the present invention can be applied regardless of the number of users.

As is apparent from the foregoing description, according to exemplary embodiments of the present invention, multiple receivers each extract channel quality of an antenna group connected to a transmitter, generate feedback information using the extracted channel quality, and then transmit the feedback information to the transmitter, thereby reducing the amount of feedback information compared to the case of feeding back channel quality of each antenna.

In addition, the transmitter according to an exemplary embodiment of the present invention is configured to receive channel qualities fed back from multiple receivers, thereby enabling scheduling such that a user data stream is transmitted individually via each antenna group. This contributes to an increase in the transmission capacity of the multi-antenna system.

Further, the feedback information proposed by exemplary embodiments of the present invention is similar in size to the feedback information proposed in each of the conventional SU mode and MU mode. Therefore, exemplary embodiments of the present invention can support both the SU mode and the MU mode without increasing the size of the feedback information. Moreover, because the feedback information includes a rank value indicating the beam-forming mode and/or the SIC mode, exemplary embodiments of the present invention can adaptively control the use of the feedback information when operating in the SU mode.

While the invention has been shown and described with reference to a certain preferred embodiments thereof, it will be understood by those skilled in the art that various changes in form and details may be made therein without departing from the spirit and scope of the invention as defined by the appended claims and their equivalents.

What is claimed is:

1. A method for receiving data in a closed-loop multi-antenna system that defines multiple antenna groups by antenna grouping on multiple antennas, and performs data transmission individually via each of the multiple antenna groups, the method comprising the steps of:
   acquiring, from a received signal, channel quality information for each data stream transmitted individually via each antenna group corresponding to a transmission mode, which is one of a multi-user mode and a single-user mode selected depending on a comparison result between a sum rate (R_MU) in the multi-user mode and a sum rate (R_SU) in the single-user mode calculated by using a feedback information;
   determining, from the channel quality information acquired individually for each antenna group, maximum channel quality information, an antenna group index associated with the maximum channel quality information, rank information, and remaining channel quality information associated the rank information; and
   transmitting the determined maximum channel quality information, antenna group index, rank information, and remaining channel quality information to a transmission apparatus as the feedback information.

2. The method of claim 1, wherein the acquiring of channel quality information comprises:
   estimating a channel characteristic associated with each data stream transmitted individually via each antenna group through channel estimation on the received signal; and
   acquiring channel quality information associated with each data stream transmitted individually via each antenna group based on the estimated channel characteristic.

3. The method of claim 2, wherein the determining of maximum channel quality information comprises:
   calculating channel quality information for each data stream transmitted individually via each antenna group based on the estimated channel characteristic using a first signal detection technique; and
   comparing the channel quality information calculated individually for each data stream and determining a best channel quality information as the maximum channel quality information.

4. The method of claim 3, wherein the determining of rank information comprises:
   calculating channel quality information for a data stream transmitted via one of the antenna groups based on the estimated channel characteristic using a second signal detection technique;
   calculating channel quality information for a data stream transmitted via one of the antenna groups based on the estimated channel characteristic using a third signal detection technique; and
   determining the rank information depending on the channel quality information calculated using the second signal detection technique and the channel quality information calculated using the third signal detection technique.

5. The method of claim 4, wherein the first signal detection technique is a linear detection technique, and the second signal detection technique is a nonlinear detection technique.

6. The method of claim 5, wherein the third signal detection technique is a technique of turning off remaining antenna groups, except for one antenna group, among the antenna groups, and performing channel estimation on a data stream transmitted via the one antenna group.

7. The method of claim 4, wherein the first signal detection technique is a Minimum Mean Square Error (MMSE) technique, the second signal detection technique is a Successive Interference Cancellation (SIC) technique, and the third signal detection technique is a beam-forming technique.

8. The method of claim 7, wherein the channel quality information is an Effective Signal-to-Noise Ratio (ESN).

9. The method of claim 8, wherein the determining of rank information comprises:
   calculating a first rate depending on the maximum channel quality information and an ESN calculated by the SIC technique;
   calculating a second rate depending on an ESN calculated by the beam-forming technique;
   comparing the first rate with the second rate; and
   determining the rank information depending on the comparison result.

10. The method of claim 9, wherein the determining of rank information comprises:
   if the first rate is less than or equal to the second rate, determining the rank information as a value for requesting transmission of multiple data streams via the antenna group; and if the first rate is greater than the second rate, determining the rank information as a value for requesting transmission of one data stream via the antenna group.

11. The method of claim 10, wherein the determining of remaining channel quality information comprises:
if the first rate is less than or equal to the second rate, determining the remaining channel quality information as an ESN calculated by the SIC technique; and
if the first rate is greater than the second rate, determining the remaining channel quality information as an ESN calculated by the beam-forming technique.

12. An apparatus for receiving data in a closed-loop multi-antenna system that defines multiple antenna groups by antenna grouping on multiple antennas, and performs data transmission individually via each of the multiple antenna groups, the apparatus comprising:
a channel estimator for acquiring, from a received signal, channel quality information for each data stream transmitted individually via each antenna group;
a feedback information generator for determining, from the channel quality information acquired individually for each antenna group corresponding to a transmission mode, which is one of a multi-user mode and a single-user mode selected depending on a comparison result between a sum rate (R_MU) in the multi-user mode and a sum rate (R_SU) in the single-user mode calculated by using a feedback information, maximum channel quality information, an antenna group index associated with the maximum channel quality information, rank information, and remaining channel quality information associated the rank information, and generating feedback information depending on the determined maximum channel quality information, antenna group index, rank information, and remaining channel quality information; and
a transmitter for transmitting the feedback information to a transmission apparatus.

13. The apparatus of claim 12, wherein the channel estimator estimates a channel characteristic associated with each data stream transmitted individually via each antenna group through channel estimation on the received signal, and acquires channel quality information associated with each data stream transmitted individually via each antenna group based on the estimated channel characteristic.

14. The apparatus of claim 13, wherein the feedback information generator calculates channel quality information for each data stream transmitted individually via each antenna group based on the estimated channel characteristic using a first signal detection technique, compares the channel quality information calculated individually for each data stream, and determines best channel quality information as the maximum channel quality information.

15. The apparatus of claim 14, wherein the feedback information generator calculates channel quality information for a data stream transmitted via one of the antenna groups based on the estimated channel characteristic using a second signal detection technique, calculates channel quality information for a data stream transmitted via one of the antenna groups based on the estimated channel characteristic using a third signal detection technique, and determines the rank information depending on the channel quality information calculated using the second signal detection technique and the channel quality information calculated using the third signal detection technique.

16. The apparatus of claim 15, wherein the first signal detection technique is a linear detection technique, and the second signal detection technique is a nonlinear detection technique.

17. The apparatus of claim 16, wherein the third signal detection technique is a technique of turning off remaining antenna groups, except for one antenna group, among the antenna groups, and performing channel estimation on a data stream transmitted via the one antenna group.

18. The apparatus of claim 15, wherein the first signal detection technique is a Minimum Mean Square Error (MMSE) technique, the second signal detection technique is a Successive Interference Cancellation (SIC) technique, and the third signal detection technique is a beam-forming technique.

19. The apparatus of claim 18, wherein the channel quality information is an Effective Signal-to-Noise Ratio (ESN).

20. The apparatus of claim 19, wherein the feedback information generator calculates a first rate depending on the maximum channel quality information and an ESN calculated by the SIC technique, calculates a second rate depending on an ESN calculated by the beam-forming technique, compares the first rate with the second rate, and determines the rank information depending on the comparison result.

21. The apparatus of claim 20, wherein the feedback information generator determines the rank information as a value for requesting transmission of multiple data streams via the antenna group if the first rate is less than or equal to the second rate, and determines the rank information as a value for requesting transmission of one data stream via the antenna group if the first rate is greater than the second rate.

22. The apparatus of claim 21, wherein the feedback information generator determines the remaining channel quality information as an ESN calculated by the SIC technique if the first rate is less than or equal to the second rate, and determines the remaining channel quality information as an ESN calculated by the beam-forming technique if the first rate is greater than the second rate.

23. A method for transmitting data in a closed-loop multi-antenna system that defines multiple antenna groups by antenna grouping on multiple antennas, and performs data transmission individually via each of the multiple antenna groups, the method comprising the steps of:
receiving, from multiple reception apparatuses, feedback information including maximum channel quality information, an antenna group index associated with the maximum channel quality information, rank information, and remaining channel quality information;
calculating a sum rate (R_MU) in a multi-user mode based on the maximum channel quality information and the antenna group index, provided as feedback information from each reception apparatus;
calculating a sum rate (R_SU) in a single-user mode based on the rank information, the remaining channel quality information, and the maximum channel quality information, provided as feedback information from each reception apparatus;
selecting one of the single-user mode and the multi-user mode as a transmission mode depending on a comparison result between the sum rate (R_MU) in the multi-user mode and the sum rate (R_SU) in the single-user mode; and
transmitting a data stream according to the selected transmission mode.

24. The method of claim 23, wherein the calculating of a sum rate (R_MU) in a multi-user mode comprises:
- collecting the maximum channel quality information individually for each antenna group depending on the antenna index;
- selecting maximum channel quality information individually for each antenna group from the maximum channel quality information collected for each antenna group; and
- calculating the sum rate (R_MU) in the multi-user mode depending on a sum of the maximum channel quality information selected individually for each antenna group.

25. The method of claim 24, wherein the calculating of a sum rate (R_SU) in a single-user mode comprises:
- collecting channel quality information associated with each antenna group taking into account the rank information individually for each reception apparatus;
- calculating a sum rate individually for each reception apparatus based on the channel quality information collected for each antenna group; and
- determining, as the sum rate (R_SU) in the single-user mode, a greatest sum rate among the sum rates calculated individually for each reception apparatus.

26. The method of claim 25, wherein the channel quality information collected for each antenna group is one of maximum channel quality information, and remaining channel quality information included in feedback information from a corresponding reception apparatus.

27. The method of claim 26, wherein the maximum channel quality information and the remaining channel quality information are an Effective Signal-to-Noise Ratio (ESN).

28. The method of claim 27, wherein the selecting of a transmission mode comprises:
- selecting the multi-user mode as a transmission mode if the sum rate (R_SU) in the single-user mode is less than or equal to the sum rate (R_MU) in the multi-user mode; and
- selecting the single-user mode as a transmission mode if the sum rate (R_SU) in the single-user mode is greater than the sum rate (R_MU) in the multi-user mode.

29. An apparatus for transmitting data in a closed-loop multi-antenna system that defines multiple antenna groups by antenna grouping on multiple antennas, and performs data transmission individually via each of the multiple antenna groups, the apparatus comprising:
- a feedback information processor for receiving, from multiple reception apparatuses, feedback information including maximum channel quality information, an antenna group index associated with the maximum channel quality information, rank information, and remaining channel quality information, calculating a sum rate (R_MU) in a multi-user mode based on the maximum channel quality information and the antenna group index, provided as the feedback information from each reception apparatus, calculating a sum rate (R_SU) in a single-user mode based on the rank information, the remaining channel quality information, and the maximum channel quality information, provided as the feedback information from each reception apparatus, and selecting one of the single-user mode and the multi-user mode as a transmission mode depending on a comparison result between the sum rate (R_MU) in the multi-user mode and the sum rate (R_SU) in the single-user mode, selecting one of the single-user mode and the multi-user mode as the transmission mode depending on the feedback information, and performing control according to the selected transmission mode; and
- a transmitter for receiving a data stream to be transmitted to each reception apparatus, and transmitting the data stream according to one of the multi-user mode and the single-user mode under control of the feedback information processor.

30. The apparatus of claim 29, wherein the feedback information processor collects the maximum channel quality information individually for each antenna group depending on the antenna index; selects maximum channel quality information individually for each antenna group from the maximum channel quality information collected for each antenna group; and calculates the sum rate (R_MU) in the multi-user mode depending on a sum of the maximum channel quality information selected individually for each antenna group.

31. The apparatus of claim 30, wherein the feedback information processor collects channel quality information associated with each antenna group taking into account the rank information individually for each reception apparatus; calculates a sum rate individually for each reception apparatus based on the channel quality information collected for each antenna group; and determines, as the sum rate (R_SU) in the single-user mode, a greatest sum rate among the sum rates calculated individually for each reception apparatus.

32. The apparatus of claim 31, wherein the channel quality information collected for each antenna group is one of maximum channel quality information and remaining channel quality information included in feedback information from a corresponding reception apparatus.

33. The apparatus of claim 32, wherein the maximum channel quality information and the remaining channel quality information are an Effective Signal-to-Noise Ratio (ESN).

34. The apparatus of claim 33, wherein the feedback information processor selects the multi-user mode as a transmission mode if the sum rate (R_SU) in the single-user mode is less than or equal to the sum rate (R_MU) in the multi-user mode; and selects the single-user mode as a transmission mode if the sum rate (R_SU) in the single-user mode is greater than the sum rate (R_MU) in the multi-user mode.

* * * * *